US012619031B2

(12) United States Patent
Wang et al.

(10) Patent No.: US 12,619,031 B2
(45) Date of Patent: May 5, 2026

(54) SYSTEMS AND METHODS TO REDUCE EMI FOR FIBER OPTIC ARRAYS

(71) Applicants: Xiwen Wang, Gilroy, CA (US); Zining Huang, Fremont, CA (US); David Meghavoryan, San Jose, CA (US); Jian Yang, San Jose, CA (US); Qinrong Yu, Fremont, CA (US); Xiaobing Luo, San Jose, CA (US)

(72) Inventors: Xiwen Wang, Gilroy, CA (US); Zining Huang, Fremont, CA (US); David Meghavoryan, San Jose, CA (US); Jian Yang, San Jose, CA (US); Qinrong Yu, Fremont, CA (US); Xiaobing Luo, San Jose, CA (US)

(73) Assignee: O-Net Communications, Inc., San Jose, CA (US)

( * ) Notice: Subject to any disclaimer, the term of this patent is extended or adjusted under 35 U.S.C. 154(b) by 380 days.

(21) Appl. No.: 18/211,689

(22) Filed: Jun. 20, 2023

(65) Prior Publication Data

US 2024/0427087 A1      Dec. 26, 2024

(51) Int. Cl.
*G02B 6/36* (2006.01)
(52) U.S. Cl.
CPC ................................. *G02B 6/3672* (2013.01)

(58) Field of Classification Search
CPC ...................................................... G02B 6/3672
See application file for complete search history.

(56) References Cited

U.S. PATENT DOCUMENTS

| | | | | |
|---|---|---|---|---|
| 2001/0040043 A1* | 11/2001 | Ortiz | ................. | H01R 13/6599 |
| | | | | 174/117 F |
| 2011/0186696 A1* | 8/2011 | Hsieh | ........................ | F16L 3/12 |
| | | | | 248/74.1 |
| 2012/0015555 A1* | 1/2012 | Deimel | ................ | H05K 9/0018 |
| | | | | 439/607.41 |
| 2017/0062973 A1* | 3/2017 | Fernandez | ............... | H01R 4/64 |
| 2020/0176937 A1* | 6/2020 | Azad | .................. | H01R 13/6596 |

* cited by examiner

*Primary Examiner* — Uyen Chau N Le
*Assistant Examiner* — Hoang Q Tran
(74) *Attorney, Agent, or Firm* — PatentPC

(57) ABSTRACT

A system for sealing EMI leakage from an optical fiber array belt includes a clamp made of a first conductive material, the clamp having a substantially U-shaped chamber; and a sealant having first and second ends to receive the optical fiber array belt in between. The clamp is movable from an upper portion of the sealant to a predetermined position on the sealant, thereby closing the first and second ends of the sealant to establish an electrical connection; and wherein the sealant prevents EMI leakage from the optical fiber array belt.

17 Claims, 5 Drawing Sheets

SYSTEMS AND METHODS TO REDUCE EMI FOR FIBER OPTIC ARRAYS

BACKGROUND

The present system relates to an improved system for securing and protecting optical fiber array belts, which are essential components in telecommunication networks, particularly in the areas of data transmission and high-speed internet connectivity.

Fiber optics play a crucial role in modern telecom transceivers, providing a reliable and efficient means of transmitting data over long distances. For example, fiber optic cables offer a significantly higher data-carrying capacity compared to traditional copper cables. They can transmit large amounts of data over long distances without degradation. This makes them ideal for telecom applications where high-speed data transmission is required. Fiber optics enable long-distance transmission of data without significant signal loss. Unlike copper cables, which suffer from attenuation over long distances, optical fibers can transmit signals for tens or hundreds of kilometers with minimal loss. This allows for the establishment of long-haul telecom networks, connecting distant locations efficiently. Fiber optics support high bandwidth scalability, allowing for the accommodation of increasing data demands. As telecom networks continue to evolve and require higher data rates, fiber optics can easily support these growing bandwidth requirements by utilizing advanced modulation techniques and higher data transmission rates. Fiber optics offer enhanced security for data transmission. Unlike copper cables, which can be tapped or suffer from electromagnetic snooping, optical fibers are difficult to tap without being detected. This makes fiber optics a preferred choice for transmitting sensitive or confidential data in telecom networks, ensuring data privacy and security. Fiber optic cables are thinner and lighter than copper cables, making them easier to install, handle, and manage within telecom transceivers. Their compactness allows for higher cable density and more efficient use of physical space in equipment racks or data centers.

In today's digital era, the demand for high-speed communication has increased exponentially. As such, the use of optical fiber cables, which provide a more reliable and faster means of communication with minimal signal loss and interference, has become highly desirable. One of the most common configurations for implementing optical fiber cables is the optical fiber array belt, which comprises a plurality of individual optical fibers housed within a protective sheath.

Optical fiber array belts are widely used in various industries for high-speed data transmission and communication. These belts consist of multiple optical fibers aligned and bundled together and are known for their exceptional bandwidth capacity. The use of optical fibers has become increasingly popular due to their many advantages, such as low signal loss, immunity to electrical noise, high bandwidth, and resistance to environmental factors. However, despite these advantages, of electromagnetic interference (EMI) can still infiltrate the optical fiber array belt, causing signal degradation and negatively impacting overall system performance. These optical fibers are delicate and require proper handling and protection to ensure their longevity and sustained performance. However, the existing methodologies and systems employed for securing and protecting these optical fiber array belts often fall short in terms of durability, reliability and practicality. There exists a need for an improved system designed to effectively secure and protect these optical fiber array belts.

EMI is a disturbance caused by external electromagnetic fields, which can interfere with the proper functioning of electronic devices and hinder data transmission over optical fibers. Existing techniques for EMI shielding involve the use of conductive materials or coatings that are added to optical fiber exteriors.

SUMMARY

In one aspect, a system and method for sealing EMI leakage from an optical fiber array belt are provided. The system includes a conductive clamp with a U-shaped chamber and a sealant with two ends designed to receive the optical fiber array belt. The clamp is moved along the sealant, closing the first and second ends and establishing an electrical connection. The sealant prevents EMI leakage from the optical fiber array belt. The method includes positioning the clamp, moving it to close the ends of the sealant, and placing the optical fiber array belt within the sealant to prevent EMI leakage. The sealant may have two arc-shaped wings that are coaxial and contact fixed supports to prevent downward movement. Vertical force applied to the clamp results in force components to close the sealant and maintain its position.

In another aspect, a system for sealing EMI leakage from an optical fiber array belt includes a clamp made of a first conductive material, the clamp having a substantially U-shaped chamber; and a sealant having first and second ends to receive the optical fiber array belt in between; wherein the clamp is movable from an upper portion of the sealant to a predetermined position on the sealant, thereby closing the first and second ends of the sealant to establish an electrical connection; and wherein the sealant prevents EMI leakage from the optical fiber array belt.

Implementation of the above aspects may include one or more of the following. The sealant comprises two arc-shaped wings. The two arc-shaped wings are coaxial. Two fixed supports that the wings will contact tangentially. A vertical force is applied to the clamp to move it downward, generating two force components: a normal force to the sealant surfaces, pushing the sealant to close; and a friction force along the sealant surfaces, attempting to move the sealant downward. The two fixed supports overcome the friction force and prevent the sealant from moving downward. The two wings are concentric, such that when the sealant closes, the sealant's two sides only rotate without any vertical movement. The first and second ends comprise a metal. The first and second conductive rubber portions secured to first and second inner sides of the sealant and adapted to secure the optical fiber array belt between the first and second conductive rubber portions.

In another aspect, a method for sealing EMI leakage from an optical fiber array belt using a clamp and a sealant, comprising providing a clamp made of a first conductive material, wherein the clamp has a substantially U-shaped chamber; providing a sealant with first and second ends capable of receiving the optical fiber array belt between them; positioning the clamp at an upper portion of the sealant; moving the clamp from the upper portion to a predetermined position on the sealant, thereby closing the first and second ends of the sealant and establishing an electrical connection; securing the clamp in the predetermined position to maintain the closure of the first and second ends of the sealant; and placing the optical fiber array belt within the sealant between the closed first and second ends to prevent EMI leakage from the optical fiber array belt with the sealant.

Implementation of the above aspects may include one or more of the following. The method includes forming the sealant with two arc-shaped wings. The process ensues that the two arc-shaped wings are coaxial. Two fixed supports are provided for the sealant and aligning the two wings with the fixed supports such that the wings make tangential contact with the supports. The method includes applying a vertical force to the clamp to move it downward; and generating two force components: a normal force to the sealant surfaces, pushing the sealant to close; and a friction force along the sealant surfaces, attempting to move the sealant downward. The method includes overcoming the friction force with the two fixed supports, preventing the sealant from moving downward. The method includes ensuring that the two wings of the sealant are concentric; wherein when the sealant closes, the two sides of the sealant only rotate without any vertical movement. A screw or fastener can secure the clamp to ground. That also makes the EMI sealant electric connection with ground.

Advantages of the system may include one or more of the following. The system aims to provide an efficient, reliable and durable solution to safeguard the optical fiber array belts from external damage and environmental factors while ensuring its optimum performance. The system significantly reduces electromagnetic interference (EMI) leakage on the electronics near the fiber optics and helps maintain signal integrity and reduces the risk of data corruption. The system also enables multi connectors with vertical fiber belt in a limited space to provide the EMI sealant part. As the sealant cannot be added from the sides, the top is best open port to install the sealant, but if install the sealant without system of FIG. 1, because the small space limited, the sealant part vertical movement may push and damage the fiber belt. The system also enables a user to check if the belt array is fully sealed.

In sum, the sealant offers the advantage of protecting against EMI leakage, ensuring signal integrity, providing reliability and stability, facilitating easy installation and maintenance, exhibiting durability, and offering compatibility with different optical fiber array belts. These advantages contribute to an overall improved performance and functionality of the telecom transceiver system. The system exhibits high reliability and durability, with minimal susceptibility to environmental factors such as temperature, moisture, or corrosion. They are less prone to damage from external interference and provide a stable and consistent signal quality, resulting in improved network performance and uptime.

DETAILED DESCRIPTION

Figure 1:
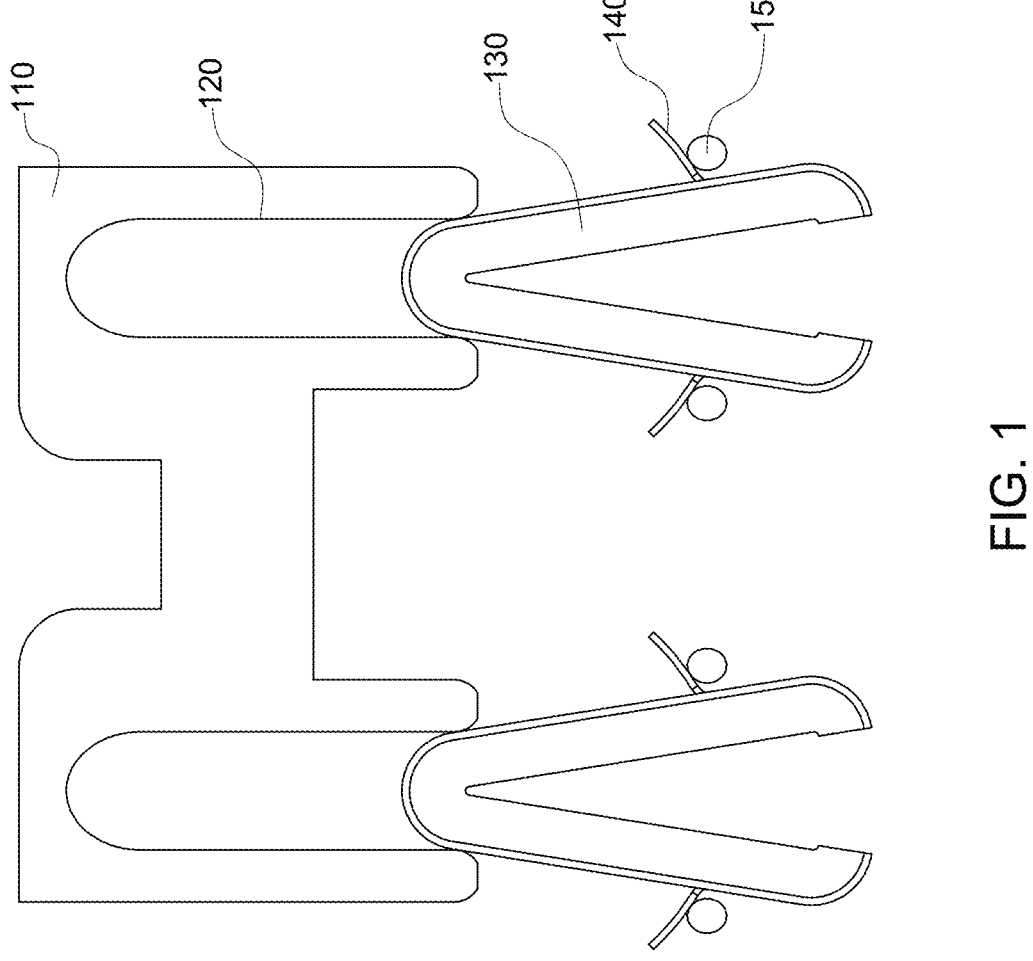
FIG. 1 shows an exemplary EMI reduction system for fiber optics.

FIG. 1 shows an exemplary clamp 110 and sealant 130 system that creates an effective EMI shield around an optical fiber array belt. The clamp is made of a first conductive material (such as copper or aluminum or a suitable metal) and has one or more substantially U-shaped chambers/openings, which allows it to be easily placed over sealants 130 that in turn enclose the optical fiber array belt. The sealant 130, made of a second conductive material such as conductive rubber, has first and second ends and is designed to receive the optical fiber array belt in between. When moved to a predetermined position on the sealant, the clamp establishes an electrical connection between the first and second conductive materials, while the sealant prevents EMI leakage from the optical fiber array belt.

The clamp 110 with two U-shaped openings 120 is adapted to receive sealants 130 that have a substantially oval shaped when closed. The sealant 130 includes a metal spring-like body with a compressible conductive material on the inside and can open at one end. The sealant 130 also has conductive rubber or elastomeric material on the interior so that when closed the elastomeric material securely holds the optical fiber array belt in the center.

FIG. 1 depicts a clamp with U-shaped openings designed to accommodate sealants. These sealants have an oval shape when closed and are made of a compressible conductive material. The purpose of these sealants is to secure an optical fiber array belt in the center using an interior layer of conductive rubber or elastomeric material.

The clamp 110 refers to a device or mechanism used to hold or fasten the sealants in place. It may have a specific design tailored to fit the U-shaped openings and ensure a secure connection. The U-shaped openings, labeled as 120, are specifically designed to receive the sealants, and the clamps 110 are actuated so that sealants 130 are inserted into the clamp 110 through openings 120.

Sealants 130 have a substantially oval shape when closed and are capable of being opened at one end and then closed to form the oval shape. The purpose of these sealants 130 is likely to provide a tight and secure seal around the optical fiber array belt, preventing EMI as well as dust, moisture, or other contaminants from affecting the performance of the optical fibers.

Additionally, the sealants are made of a compressible conductive material with compressibility and electrical conductivity. The compressible nature of the material allows it to conform to the shape of the optical fiber array belt when closed, ensuring a snug fit. The conductive properties may serve various purposes, such as grounding or shielding the optical fibers against electromagnetic interference. The conductive rubber or elastomeric material lines the inner surface of the sealant and provides additional grip and stability to securely hold the optical fiber array belt in the center when the sealant is closed. The conductive properties of this rubber or elastomeric material might also contribute to the overall electrical conductivity of the sealant assembly.

The system and method for sealing EMI leakage from an optical fiber array belt are highly effective in preventing EMI leakage. This design ensures that optical fiber array belts maintain their performance integrity and remain protected from any potential EMI disruptions. Additionally, the clamp and sealant system are fully adjustable and easily installed, providing a time and cost-effective solution to a prevalent problem in the industry. The arrangement of FIG. 1 provides the fiber optic system with numerous advantages, including high data capacity, long-distance transmission, immunity to EMI, enhanced security, and reliability.

Figure 2:
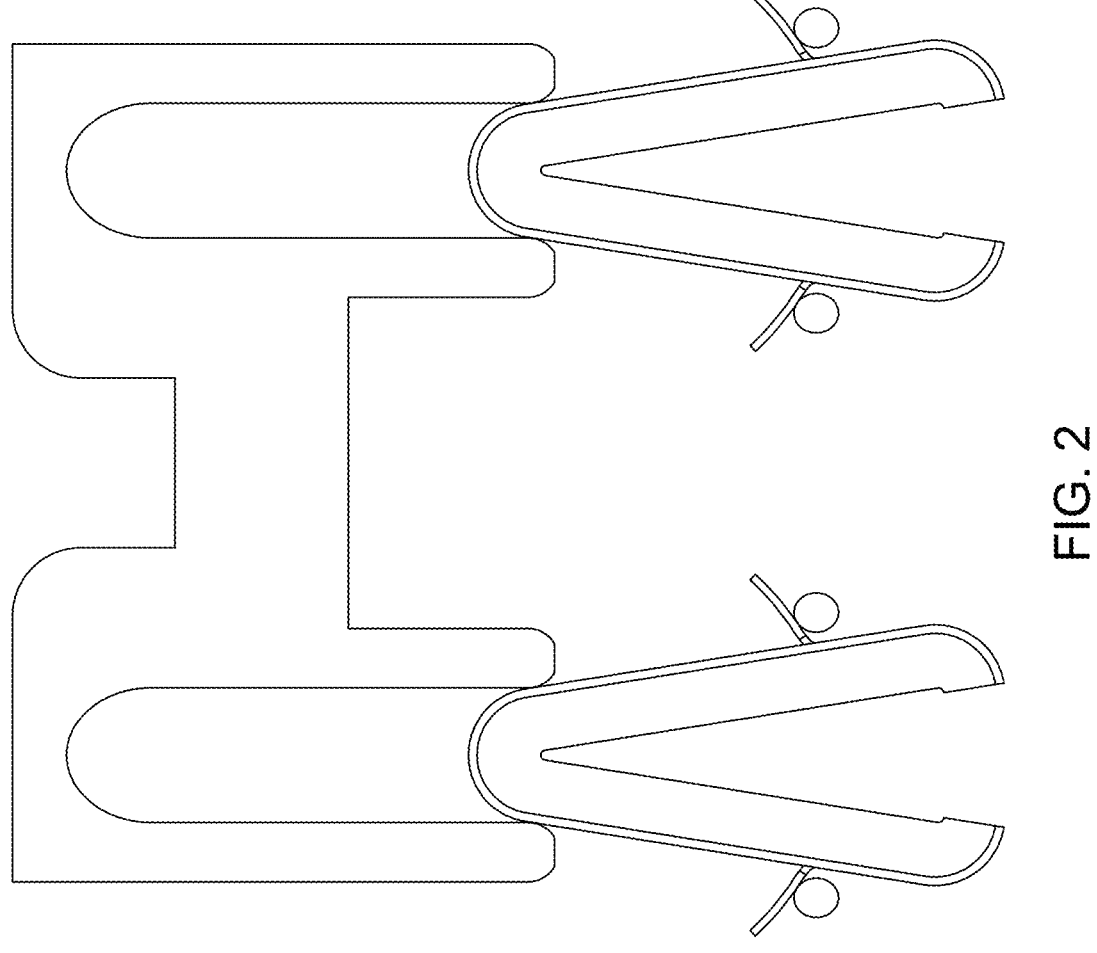
FIG. 2 shows in more details the clamp and sealant of FIG. 1.
Figure 3:
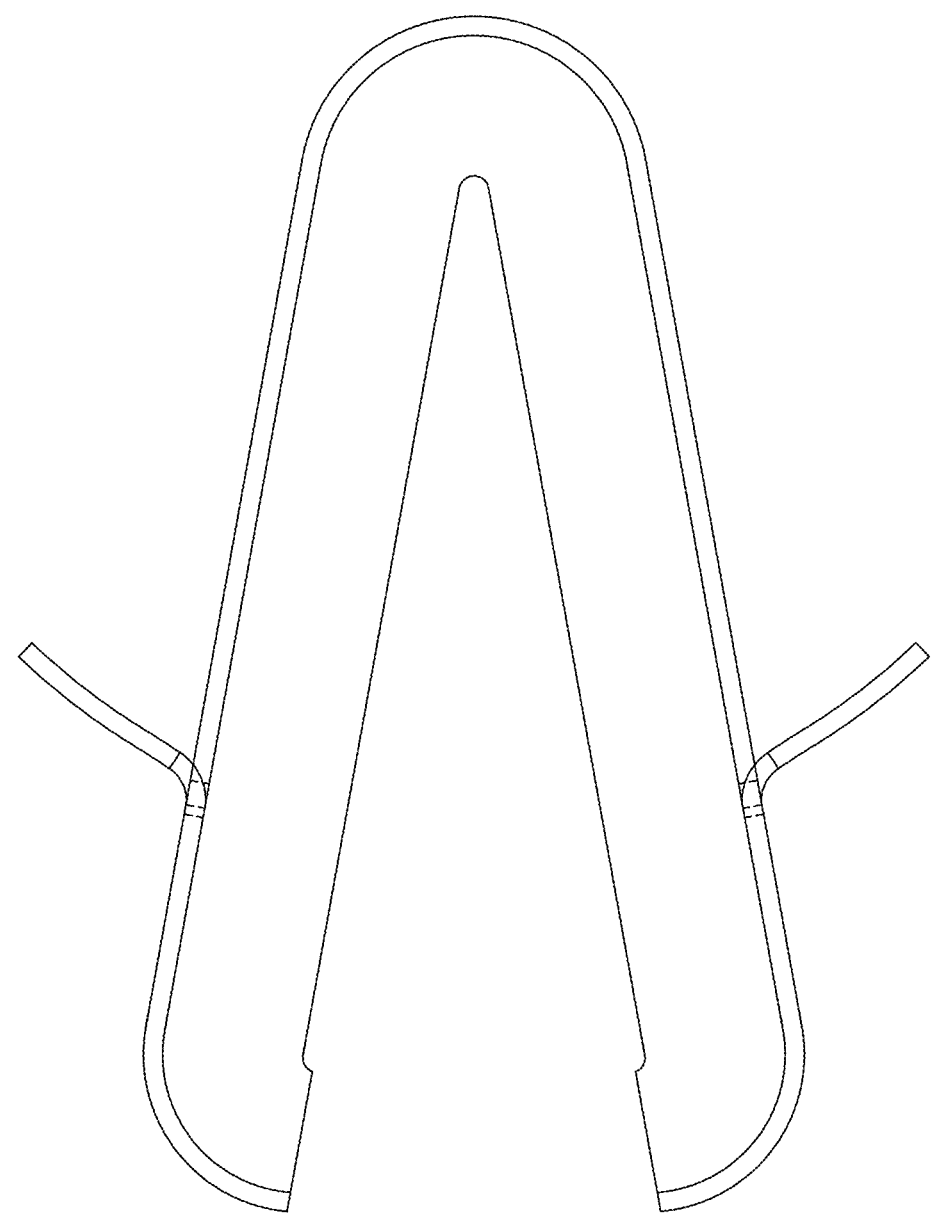
FIG. 3 shows more details of the sealant of FIG. 1.
Figure 4:
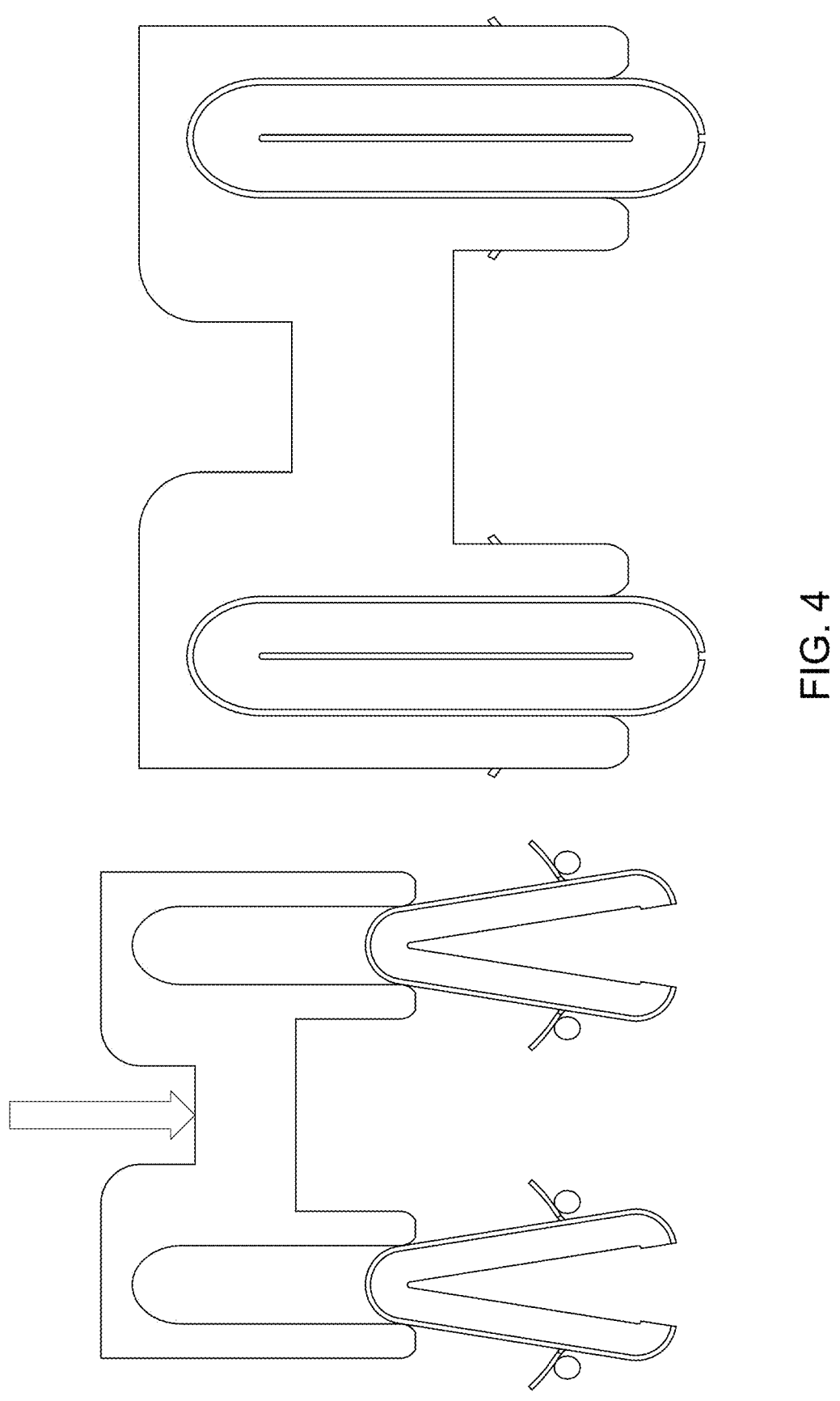
FIG. 4 shows the system in operation to clamp the fiber optic array belt and reduce EMI.

FIG. 2 shows the clamp movement from an upper portion of the sealant to a predetermined position on the sealant to close the first and second ends to complete an electrical connection, wherein the sealant prevents the EMI leakage from the optical fiber array belt. As further shown in FIG. 2, two arc-shaped wings 140 are placed on the outside surface of sealant 130. The arc-shaped wings 140 are placed above support rollers 150, which are preferably made of a flexible, yet robust and durable material that can withstand wear and tear and maintain its shape over time. The support rollers 150 are designed to accommodate the wings in such a manner that each support is tangentially in contact with the leading and trailing edges of the wing.

This flexibility allows the wings 140 to adapt to different diameters and configurations of the objects to be sealed, as well as providing enhanced resistance to environmental factors such as temperature changes, humidity, and corrosive substances. In one embodiment, these wings 140 can be easily detached and reattached to the sealant system, thus allowing for easy installation and removal, as well as the possibility of replacement or repair if necessary.

The vertical force pushes the clamp to move down; It will generate two force components: normal to the sealant surfaces to push the sealant to close, and friction force along the sealant surfaces try to move the sealant move down. The two fixed supports overcome the friction force and stop the sealant from moving down. Also, the two wings are co-axial. When the sealant closes, the sealant two sides only rotate without any vertical movement. (This vertical movement may damage the fiber).

The two arc-shaped wings follow a curved trajectory. The wings are fashioned in a manner that allows them to seamlessly connect with the central hub, while the curved design ensures that they will remain rigid and maintain their shape under various operational conditions. Furthermore, the wings are coaxial, meaning that they are aligned along the same rotational axis. This unique design configuration lends itself to enhanced stability and balance, as it ensures that the wings are evenly spaced around the central hub, thus preventing any unwanted tilting or wobbling during operation.

In one embodiment, the two arc-shaped and coaxial wings 140 interact and align with the clamp 110 to form the seal. These wings 140 are designed to be joined together by a hinge or coupling mechanism, such as a joint or pin, which not only keeps the wings connected but also allows for some degree of movement between them. This hinge or coupling mechanism preferably has an adjustable tension, which means the user can fine-tune the overall tightness and pressure applied by the wings against the object to be sealed. This adjustability ensures that the seal remains effective and intact even as the object to be sealed undergoes changes in size, shape, or position. Furthermore, the hinge or coupling mechanism can also be incorporated with a locking mechanism, such as a latch or clasp, to secure the wings in place and prevent them from accidentally detaching or loosening during use. Additionally, by employing a coaxial arrangement, the system is less susceptible to wear and tear, as the balanced distribution of forces can decrease stress on critical components, therefore resulting in superior longevity and reduced maintenance requirements.

In its most basic embodiment, the clamping system comprises an adjustable clamp equipped with a specialized mechanism, allowing it to generate both vertical and lateral force components when applied to the sealant surfaces. This mechanism enables the clamp to simultaneously push the sealant surfaces together, creating an EMI seal while preventing any undesirable downward movement of the sealant. The clamp also features a highly adaptable design, making it compatible with various types of sealant surfaces, materials, and thicknesses. Furthermore, this adjustable clamp can be easily integrated into existing sealing systems, providing an additional layer of EMI sealing security and reliability.

The design optimizes the application of vertical and horizontal force components to the sealant surface, achieved through the carefully designed clamp. When a vertical force is applied to the clamp, it effectively generates two force components: a normal force acting perpendicularly to the sealant surfaces, exerting pressure to push the sealant surfaces together and create a secure seal; and a friction force acting parallel to the sealant surfaces, countering the tendency of the sealant to move downward due to the applied vertical force. This friction force thereby helps maintain the sealant's proper positioning and ensures optimum sealing performance. In summary, this innovative clamping system combines excellent sealing capabilities with remarkable adaptability and ease of use, making it an ideal solution for a wide range of applications.

The supports, which may be constructed of any durable and non-reactive material, such as metal, plastic, or composite materials, play a critical role in ensuring that the sealant remains in its intended place, thus maintaining its intended function. The fixed supports have been strategically designed and positioned within the system to provide optimal counter-pressure against the gravitational forces acting upon the sealant, therefore overcoming the friction force that would otherwise cause the sealant to move downward. As a result, the invention improves the durability, efficacy, and overall performance of the sealant materials employed in various industries.

In one embodiment, a sealing mechanism is provided that includes two concentric wings, designed to enhance the efficiency and functionality of a sealing system. The primary function of the sealing mechanism is to create a secure bond or seal between two corresponding surfaces, such as those found in plumbing, packaging, or other applications where a tight seal is necessary to prevent leakage or contamination. The sealing mechanism aims to maintain a consistent, stable, and effective seal when the two wings are closed together, ensuring the integrity of the connection between the two surfaces, and offering users a reliable and durable sealing solution.

The unique design of the concentric wings allows for smooth and precise operation of the sealing mechanism. When the wings are closed together, they rotate around a common center point, with each wing maintaining a consistent distance from and orientation relative to the other. This ensures that both wings rotate in perfect synchronization without any vertical movement, thereby providing a more consistent and secure seal between the surfaces. Additionally, this concentric-wing design minimizes wear and tear on the sealing mechanism components, resulting in longer service life, less frequent maintenance and replacement, and overall improved performance and reliability.

Figure 5:
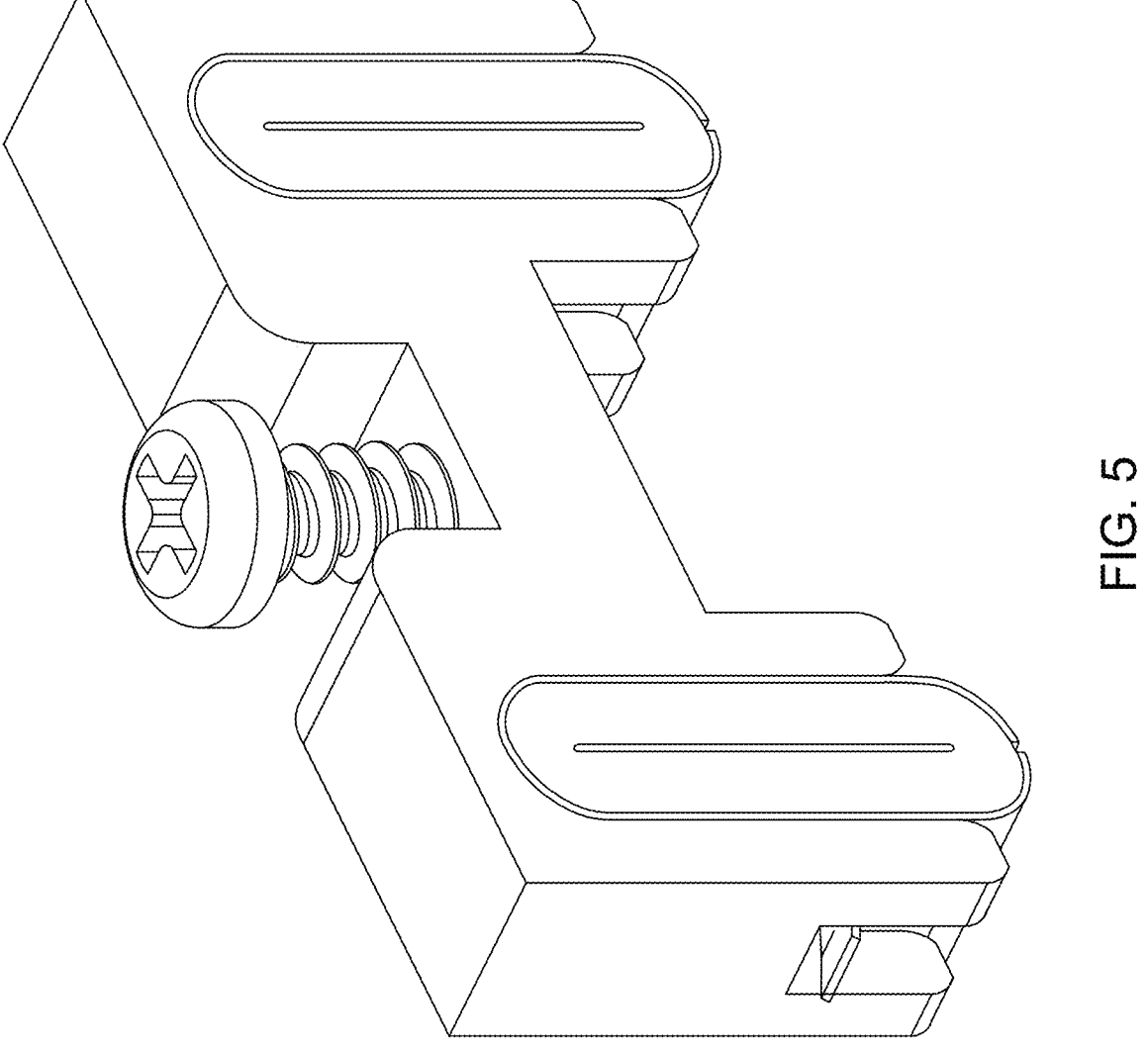
FIG. 5 shows an exemplary fasten through the hole to secure the clamp to ground.

The concentric wing design allows for a more streamlined and efficient closing process, reducing the likelihood of misalignment or uneven pressure distribution that might compromise the integrity of the seal. Furthermore, the smooth rotation of the wings without vertical movement provides users with a more intuitive and user-friendly method of operating the sealing mechanism. Finally, the reduced wear and tear associated with the concentric-wing design ensures that users can enjoy a longer-lasting and more dependable sealing solution, ultimately resulting in cost savings, improved performance, and enhanced user satisfaction. Overall, this invention represents an important contribution to the field of sealing mechanisms, offering a versatile, efficient, and reliable sealing solution for a wide range of applications. As shown in FIG. 5, a screw or fastener can secure the clamp to ground. That also makes the EMI sealant electric connection with ground.

The present system aims to address the shortcomings of traditional sealant mechanisms by employing a unique design comprising two wings, which are concentrically arranged around a central axis. This concentric configuration ensures that the wings precisely align with each other when brought together during the sealing process, thereby providing a uniform and consistent means of sealing gaps and apertures. The mechanism allows for controlled rotation around the central axis, ensuring that the wings only rotate without any vertical movement. As a result, the sealant system effectively eliminates any misalignment or uneven sealing issues commonly associated with conventional systems and provides a more reliable means of sealing.

Furthermore, the novel sealant method outlined in this invention is highly versatile and adaptable to various applications, as the concentric alignment of the two wings can be easily adjusted to accommodate different sizes and shapes of gaps or apertures. This adjustability ensures the sealant's compatibility with a wide range of scenarios, including industrial, commercial, and residential applications. The invention also promotes user convenience by simplifying the sealing process. Given its intuitive design, users can seamlessly operate the sealant and achieve precise closure without requiring intricate tools or labor-intensive techniques.

In summary, the present system discloses a method for an innovative sealant mechanism featuring two concentric wings that ensure optimal sealing performance, durability, and user convenience. This inventive system addresses the various shortcomings of traditional sealing systems and offers an efficient and versatile solution to various sealing needs across myriad applications.

The present system relates to an innovative system designed to improve the functionality, durability, and overall performance of numerous devices and structures, specifically in the context of connections between various components. The core idea of this system is centered around the unique configurations of a connecting element having first and second ends, which are both primarily composed of metal. This metallic material ensures enhanced connectivity, strength, and reliability of the connection, compared to more traditional options such as plastics, adhesives, or organic components.

The first and second ends of the connecting element comprise a metal which serves to enhance the connection's conductivity, structural integrity, and overall performance. When these metallic ends establish contact with the components they are connecting, it ensures an efficient and secure linkage between them. It is important to mention the flexibility in the types of metals that can be employed, including aluminum, copper, steel, and zinc, while always taking into consideration the specific requirements of the intended application. The type of metal selected is crucial as it directly influences the strength, flexibility, weight, and cost of the system. Furthermore, the design of the connecting element may involve various shapes, sizes, and configurations, depending on the nature of the application and the type of load the connection is expected to bear.

The utilization of this system in electronics, for example, results in improved current flow, reduced signal loss, and enhanced heat dissipation, which in turn extends the life of electronic devices and promotes better overall performance.

The present system seeks to address these challenges by providing a system that comprises a sealant having first and second inner sides, and first and second conductive rubber portions securely fastened to said inner sides. The optical fiber array belt is placed between these first and second conductive rubber portions, ensuring a tight and secure fit. The conductive rubber portions not only hold the optical fiber array belt in place but also provide additional protection against abrasion, mechanical stress, and environmental factors such as moisture and temperature fluctuations. By using conductive rubber, which is known for its flexibility and excellent electrical conductivity, the system ensures effective protection while maintaining a suitable environment for the optical fibers to operate optimally. The secure and protective seal created by the conductive rubber portions provides added durability and reliability to the system. Furthermore, the use of a sealant further strengthens the bond between the optical fiber array belt and the conductive rubber portions and prevents any unintended detachment or loss of the protective seal. By employing a sealing system comprising first and second conductive rubber portions that provide a secure and protective fit for the optical fiber array belts, the invention ensures optimum performance and longevity of these crucial components within the telecommunications industry. This invention is expected to be highly beneficial for effectively meeting the growing demands of high-speed and reliable communication systems.

The present system pertains to a method and system for sealing electromagnetic interference (EMI) leakage from an optical fiber array belt using a clamp and a sealant. The method and system are designed to protect sensitive electronic components and systems from the adverse effects of EMI leakage, which can result in signal loss, reduced performance, or even system failure. The current invention achieves this objective by utilizing a clamp mechanism made of a conductive material in combination with a sealant, creating a secure and efficient EMI barrier around the optical fiber array belt.

The method comprises the use of a clamp, made of a first conductive material, having a substantially U-shaped chamber, which is designed to facilitate the closure of the sealant around the optical fiber array belt. The sealant has first and second ends that can receive the optical fiber array belt between them. The clamp is placed at an upper portion of the sealant, and is moved from this position to a predetermined position on the sealant, thereby closing the first and second ends of the sealant and establishing an electrical connection. The clamp is then secured in the predetermined position to maintain the closure of the first and second ends, ensuring that the EMI leakage from the optical fiber array belt is effectively prevented.

The sealant is constructed from a suitable material that provides ample EMI shielding while remaining easy to use and apply around the optical fiber array belt. This material may be, for example, a flexible metallic sheet film, which can be cut to size and wrapped around the optical fiber array belt. The sealant may also possess an adhesive layer on one side to help it adhere to the optical fiber array belt, ensuring that the EMI shielding remains in place throughout the lifespan of the belt. Additionally, the clamp may be equipped with a locking mechanism or other securing features to keep it firmly in place once the desired predetermined position has been reached. The system thus provides an efficient and cost-effective method for sealing EMI leakage from an optical fiber array belt using a clamp and a sealant. This method ensures that sensitive electronic systems are protected from the potentially harmful effects of EMI, thus preserving the functional integrity and performance of these systems.

The present system relates to a sealing mechanism specifically devised to provide enhanced sealing performance and facilitate easy installation in a variety of applications, such as in pipes, mechanical devices, or any other systems that require a reliable method for preventing and mitigating leaks or other unwanted fluid flow. This improved sealing mechanism is characterized by the integration of two arc-shaped wings incorporated into the sealant's design, which allow for increased adaptability in terms of fitting and compatibility with a wide range of system components, thus offering a versatile solution in addressing the common challenges associated with conventional sealing mechanisms.

In one embodiment, the arc-shaped wings are formed by curving or bending the sealant's material at predetermined angles and radii, with the wings extending outwardly from the sealing region in substantially symmetrical fashion, thus creating an overall crescent shape. The arc-shaped wings are designed to have adequate flexibility and resilience, while maintaining the necessary rigidity and durability to withstand the typical pressures and stresses encountered in the intended working environment. The material used for the formation of the wings and the sealing region may include, but is not limited to, rubber, silicone, metal, or other suitable elastomeric or pliable materials that provide effective sealing properties and adequate resistance to wear, aging, and environmental factors such as temperature, humidity, and chemical exposure.

The arc-shaped wings serve multiple functions in relation to the overall performance of the sealing mechanism. Firstly, the wings facilitate easy installation and removal as they provide a convenient means for gripping the sealant either manually or using a dedicated tool, and enable the user to readily position and adjust the sealant to achieve optimal alignment and sealing effectiveness with minimal effort. Secondly, the arc-shaped wings can help distribute the load and pressure exerted on the sealant by the surrounding components during operation, thus minimizing the risk of material fatigue and failure in the sealing region, as well as ensuring that the sealant maintains its shape and integrity throughout its lifespan. Finally, the wings also contribute to the stability of the sealing mechanism when it is subjected to dynamic loads, vibrations, or other external forces, as they provide additional reinforcement and support, thereby ensuring that the sealant remains securely in place and retains its full sealing capability under various working conditions.

In summary, the sealing mechanism featuring two arc-shaped wings as described herein serves to provide an innovative and effective means to enhance sealing performance, ease of installation, and overall reliability in diverse applications. This sealing mechanism represents a notable advancement in addressing the limitations associated with traditional sealants and offers potential benefits to various industries and end-users who require a reliable solution for preventing leaks and maintaining fluid flow control.

The present system relates to an apparatus and method for improving the aerodynamic efficiency of a vehicle, particularly a flying vehicle such as an airplane, drone, unmanned aerial vehicle (UAV), or any other vehicle capable of travelling through air or similar fluid medium. In particular, the invention provides a mechanism in which two arc-shaped wings, positioned on either side of the vehicle's body, may be adjusted and maintained as coaxial, thus maximizing aerodynamic performance and decreasing drag during periods of flight when the vehicle is maneuvering. The described structure and functionality of the apparatus allows for optimal positioning of the wings in relation to the fluid medium, as well as the ability to modify and adjust the position of the wings in real-time during flight.

In one embodiment of the invention, a clamping mechanism is provided which can exert a controlled downward vertical force onto the sealant. This force is designed such that it generates two force components: a normal force acting upon the sealant surfaces, which pushes the sealant inwards to ensure effective closure; and a friction force acting along the sealant surfaces, which tends to move the sealant downward in a controlled manner. The normal force acts perpendicular to the surfaces of the sealant, promoting uniform pressure distribution and minimizing unevenness or gaps in the seal. Meanwhile, the friction force assists in aligning and positioning the sealant, preventing slippage or misalignment, and enabling a more efficient sealing process.

In order to optimize the performance of this sealing mechanism, various factors can be fine-tuned, such as the magnitude of the vertical force applied, the angle or orientation of the clamping mechanism, the properties of the sealant materials themselves, and the relative geometry and dimensions of the sealing surfaces. By carefully controlling these variables, the invention allows for a highly adaptable and versatile sealing solution that can be customized for a wide range of applications. Additionally, this method offers potential for automating the sealing process, which could lead to significant time and cost savings for users, as well as greater consistency and repeatability in the sealing outcomes. Overall, this system represents a significant advancement in the state of the art of sealing technologies, offering a robust, reliable, and highly effective means of ensuring secure and long-lasting seals in multiple contexts.

Furthermore, the present system allows for easy customization and modification of the clamp and sealant system to accommodate various sizes, shapes, and configurations of optical fiber array belts. This flexibility ensures a wide range of applications and compatibility with different types of optical fiber array belts and system designs. The system provides an innovative, simple, and effective system for sealing EMI leakage from an optical fiber array belt using a conductive clamp and sealant combination. This approach not only improves overall system performance but also offers flexibility and ease-of-use, making it an attractive solution for a wide range of applications in the telecommunications, data transmission, and other related industries.

The improved adapter with the dual-wing alignment feature offers various benefits and advantages over existing sealing techniques, which often involve unsteady and uneven application of sealant. Furthermore, the adapter can be designed to accommodate different types of sealants and be easily modified to conform to the specific needs and requirements of the users, allowing for a versatile and easily adaptable solution for a wide range of sealing purposes. The system reduces EMI leakage and improves performance of optical fiber in a telecom transceiver. For example, signal integrity is preserved as EMI leakage can introduce interference into the optical fiber, leading to signal degradation that can disrupt the transmission of data, causing errors, signal loss, or reduced signal quality. The system decreases bit error rates and increases the overall performance of the optical fiber link. The system reduces crosstalk between adjacent optical fibers or other electrical components within the transceiver. Crosstalk occurs when the EMI from one fiber or component interferes with the signals in nearby fibers or components which can lead to cross-channel interference and further degradation of the optical signal quality. The system decreases the noise floor level in the optical fiber system. The noise floor is the baseline level of unwanted electrical signals present in the system. By reducing EMI, the system can better distinguish the desired optical signals from the noise, increases the signal-to-noise ratio (SNR) and impact the overall system performance. EMI leakage can cause bit errors and data loss in the optical fiber communication system. The system reduces the possibility of data errors, dropped packets, or complete loss of data transmission, affecting the reliability and integrity of the communication link. By reducing EMI which can result in unpredictable signal behavior, intermittent signal disruptions, or system malfunctions, the system can reduce service outages, increase network performance, and reduce maintenance and troubleshooting efforts.

The clamping system provides an effective and reliable EMI sealing solution, and while the preferred embodiment provides EMI shielding, the same principle can be used for applications involving liquids, gases, or other fluids, as well as applicable in various industries such as automotive, chemical, pharmaceutical, and construction. The unique design of the clamping system not only enhances the overall sealing capabilities but also ensures improved adaptability and versatility in terms of accommodating different materials and thicknesses of the sealant.

What is claimed is:

1. A system for sealing EMI leakage from an optical fiber array belt, comprising:

a clamp made of a first conductive material, the clamp having a substantially U-shaped chamber; and a sealant having first and second ends to receive the optical fiber array belt in between;

wherein the clamp is movable from an upper portion of the sealant to a predetermined position on the sealant, thereby closing the first and second ends of the sealant to establish an electrical connection; and wherein the sealant prevents EMI leakage from the optical fiber array belt, wherein the clamp comprises two U-shaped receptacles at two ends, comprising a fastener positioned in the middle of the clamp to locks the clamp to ground and to generate a normal force to close the sealant and a friction force to move the sealant downward.

2. The system of claim 1, wherein the sealant comprises two arc-shaped wings.

3. The system of claim 2, wherein the two arc-shaped wings are coaxial.

4. The system of claim 3, further comprising two fixed supports that the wings will contact tangentially.

5. The system of claim 4, wherein a vertical force is applied to the clamp to move it downward, generating two force components:

a normal force to the sealant surfaces, pushing the sealant to close; and a friction force along the sealant surfaces, attempting to move the sealant downward.

6. The system of claim 5, wherein the two fixed supports overcome the friction force and prevent the sealant from moving downward.

7. The system of claim 6, wherein the two wings are concentric, such that when the sealant closes, the sealant's two sides only rotate without any vertical movement.

8. The system of claim 1, wherein the first and second ends comprise a metal.

9. The system of claim 1, comprising first and second conductive rubber portions secured to first and second inner sides of the sealant and adapted to secure the optical fiber array belt between the first and second conductive rubber portions.

10. The system of claim 1, wherein the clamp comprises a vertical assembly.

11. A method for sealing EMI leakage from an optical fiber array belt using a clamp and a sealant, comprising the steps of:

providing a clamp made of a first conductive material, wherein the clamp has a substantially U-shaped chamber and the clamp comprises two U-shaped receptacles at two ends, comprising a fastener positioned in the middle of the clamp to locks the clamp to ground and to generate a normal force to close the sealant and a friction force to move the sealant downward;

providing a sealant with first and second ends capable of receiving the optical fiber array belt between them;

positioning the clamp at an upper portion of the sealant;

moving the clamp from the upper portion to a predetermined position on the sealant, thereby closing the first and second ends of the sealant and establishing an electrical connection;

securing the clamp in the predetermined position to maintain the closure of the first and second ends of the sealant; and placing the optical fiber array belt within the sealant between the closed first and second ends to prevent EMI leakage from the optical fiber array belt with the sealant as a vertical assembly.

12. The method of claim 11, further comprising forming the sealant with two arc-shaped wings.

13. The method of claim 12, further comprising ensuring that the two arc-shaped wings are coaxial.

14. The method of claim 13, further comprising providing two fixed supports for the sealant and aligning the two wings with the fixed supports such that the wings make tangential contact with the supports.

15. The method of claim 11, further comprising applying a vertical force to the clamp to move it downward; and generating two force components:

a normal force to the sealant surfaces, pushing the sealant to close; and a friction force along the sealant surfaces, attempting to move the sealant downward.

16. The method of claim 15, further comprising overcoming the friction force with the two fixed supports, preventing the sealant from moving downward.

17. The method of claim 16, further comprising ensuring that the two wings of the sealant are concentric; wherein when the sealant closes, the two sides of the sealant only rotate without any vertical movement.

* * * * *